United States Patent [19]
Denouter et al.

[11] 3,889,518
[45] June 17, 1975

[54] DEVICE FOR CONSISTENT RESPONSE TO A FLUID PULSE AND METHOD AND APPARATUS FOR VERIFYING INSTRUMENTS UTILIZING FLUID PULSES

[75] Inventors: Pieter J. Denouter, Marlboro; Bernard Grolman, Worcester, both of Mass.

[73] Assignee: American Optical Corporation, Southbridge, Mass.

[22] Filed: Dec. 26, 1973

[21] Appl. No.: 428,477

[52] U.S. Cl................... 73/4 R; 73/1 B; 73/432 SD
[51] Int. Cl.[2]......................................... G01L 27/00
[58] Field of Search.......... 73/4 R, 1 B, 432 SD, 80; 128/2 T

[56] References Cited
UNITED STATES PATENTS

| 3,287,957 | 11/1966 | Martens | 73/1 B |
|---|---|---|---|
| 3,406,681 | 10/1968 | Zandman | 128/2 T |
| 3,736,789 | 6/1973 | Drew | 73/1 B |

FOREIGN PATENTS OR APPLICATIONS

| 211,726 | 2/1968 | U.S.S.R. | 128/2 T |

*Primary Examiner*—Richard C. Queisser
*Assistant Examiner*—Joseph W. Roskos
*Attorney, Agent, or Firm*—Alan H. Spencer; W. C. Nealon; H. R. Berkenstock Jr.

[57] ABSTRACT

A simulator having a resilient spherical section which flexes in a consistent manner when subjected to a fluid pulse mounted by frictional engagement with a tapered base inserted into the end of a body opposite the spherical surface without causing distortion or stresses within the body producing inconsistent flexing of the spherical section. A plurality of such devices may be mounted on a convenient holder for individual presentation to the fluid pulse of an instrument, such as a tonometer, to simulate specific interocular pressures for verification.

11 Claims, 8 Drawing Figures

3,889,518
PATENTED JUN 17 1975
SHEET 1
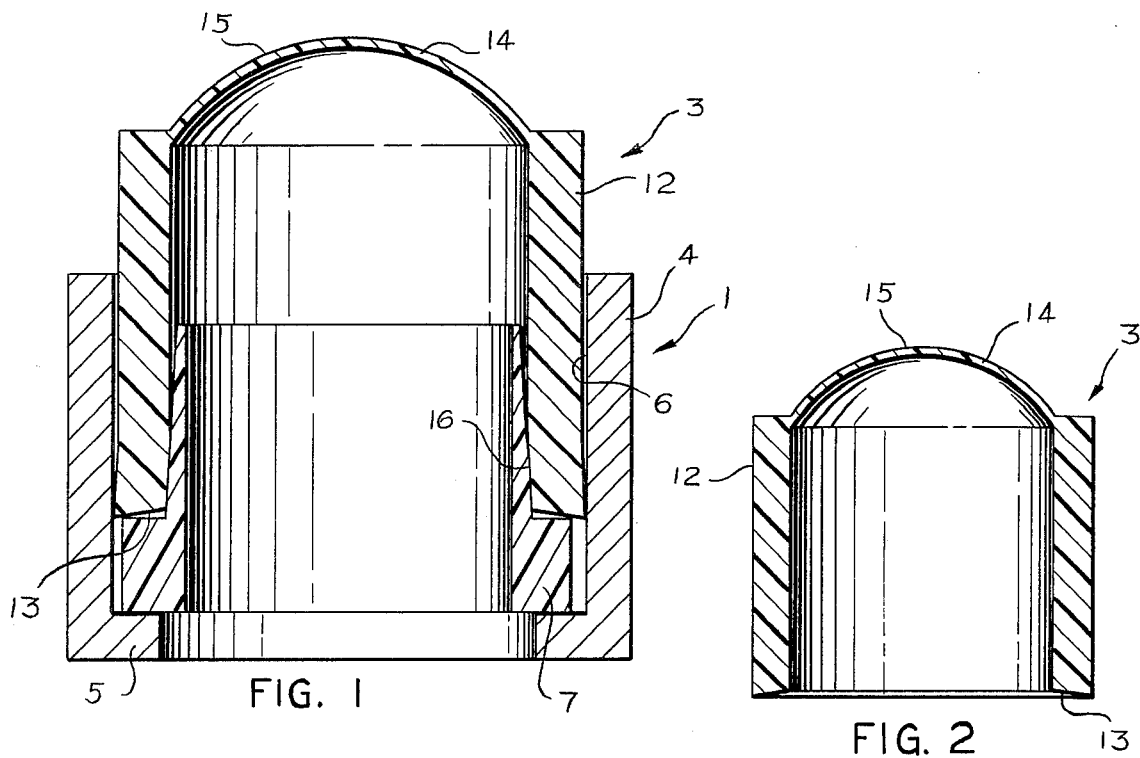
FIG. 1
FIG. 2
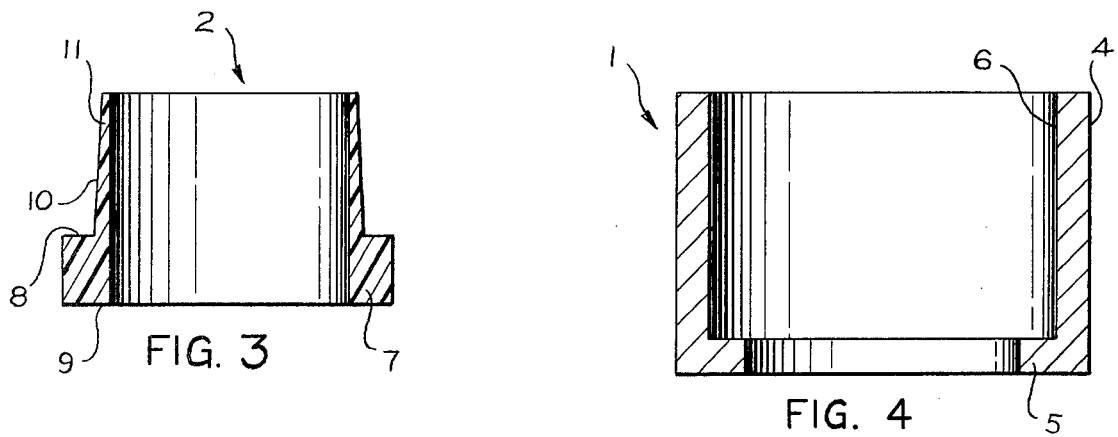
FIG. 3
FIG. 4
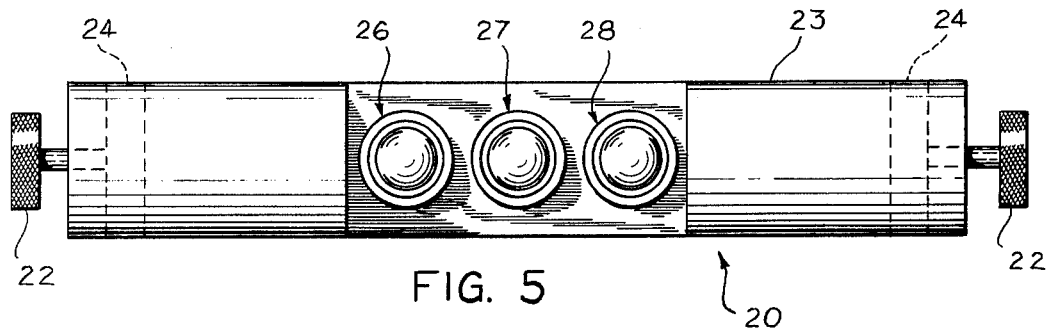
FIG. 5

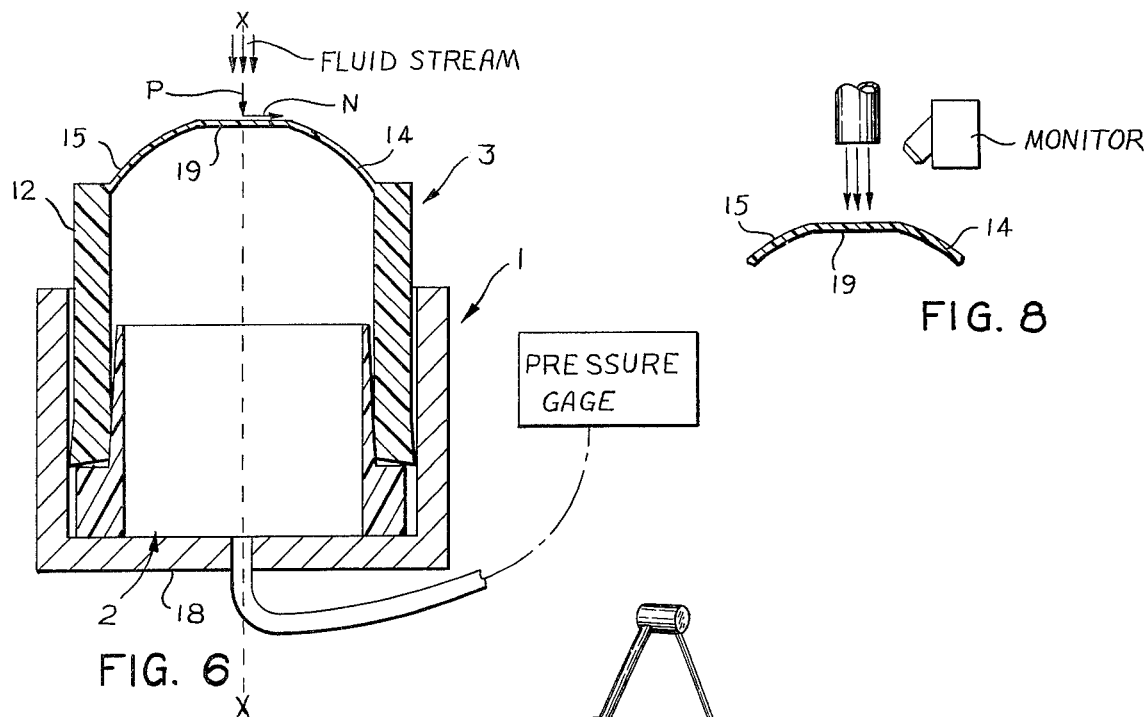
FIG. 6
FIG. 8
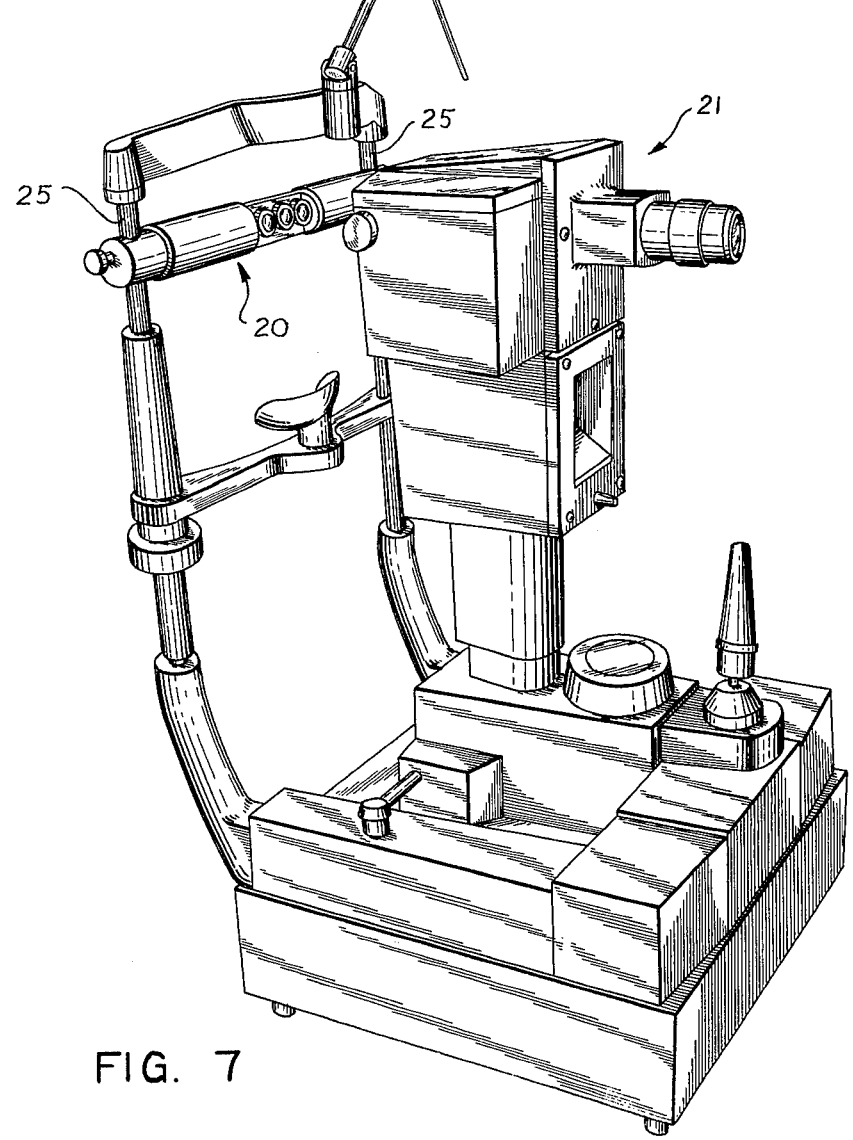
FIG. 7

DEVICE FOR CONSISTENT RESPONSE TO A FLUID PULSE AND METHOD AND APPARATUS FOR VERIFYING INSTRUMENTS UTILIZING FLUID PULSES

BACKGROUND OF THE INVENTION

This invention relates to devices for measuring testing and/or verifying fluid pulse pressures and instruments using fluid streams or pulses. A number of instruments utilize fluid pulses to determine the internal pressure of resilient bodies or conduits. One instrument of this type is a tonometer which uses a fluid pulse to cause applanation of the eye. The sensitivity of instruments of this type is extremely important and the commercial instruments generally report intraocular pressure by a direct reading display. It is, therefore, highly desirable to be able to obtain verification of the reported values of such instruments. Tonometers of this type are taught in U.S. Pat. No. 3,585,849 issued June 22, 1971; 3,572,100 issued Mar. 23, 1971; and 3,538,754 issued Nov. 10, 1970.

Flexible members including spherical flexible members which respond to pressure are extremely susceptible to inconsistent response resulting from the transfer of stresses and strains from supporting structure. This problem is not significant where the resistance to flexure is provided by an internal pressure. The problem of inconsistent flexing arises when the resistance to flex is provided by the resilient member based on its composition and thickness. The inconsistant response results from distortion and strains caused by bonding or other securing means used to mount the flexible section.

BRIEF DESCRIPTION OF THE PRESENT INVENTION AND DRAWINGS

The present invention utilizes a resilient spherical section which flexes in a consistent manner to fluid pulses. The term "fluid pulses" as used herein is applied to intermittent streams of a fluid in gaseous or liquid form. The ability of such spherical sections to flex in a consistent manner is critically dependent upon the manner in which such section and its related structure are mounted.

One object of the present invention is to provide a device having a consistent manner of response to fluid pulses.

Another object of the present invention is to provide a device which responds in a consistent manner to the application of a fluid pulse.

A still further object of the present invention is to provide a device which will consistently flex in a manner producing applanation by a fluid pulse under a chosen pressure.

It is a still further object of the present invention to provide a device for simulating a variety of selected interocular pressures to verify the fluid pulse and monitoring system of tonometers.

FIG. 1 is a side sectional view showing a simulator and mounting therefor;

FIG. 2 is a side sectional view of the simulator;

FIG. 3 is a side sectional view of the resilient base;

FIG. 4 is a side sectional view of a protective casing;

FIG. 5 is a front view of a mounting for a plurality of simulators;

FIG. 6 is a side sectional view illustrating the spherical section under the condition of applanation in an embodiment adapted for the measurement of the pressure of a fluid stream;

FIG. 7 shows a tonometer in perspective having the mounting and devices of FIG. 5 positioned thereon.

FIG. 8 is a partial view of the responder in one embodiment of the present invention.

DETAILED DESCRIPTION OF THE INVENTION

Devices according to the present invention require three essential components. A resilient spherical section having a thickness chosen to flex in a consistent manner under the pressure of a fluid pulse or stream; a hollow resilient body supporting the spherical section and a base having a tapered external surface complementing the internal shape of the hollow body to provide a supporting base for the body and section. The taper of the base is chosen to provide sufficient frictional engagement to hold the body positioned thereon and permit consistent flexing of the spherical section. The degree of taper and the position of the body in engagement therewith is chosen to avoid the uneven transfer of stresses and streams from the body to the resilient section which would cause variation in the manner in which the section flexes. Such stresses and streams are produced when the body is significantly distorted and/or when the body is directly bonded or secured to a mounting. The resilient mounting of the device of the present invention avoids the production of uneven stresses and streams resulting from distortion or bonding of the body to a mount. It is desirable to include an outwardly extending flange on the external tapered surface which may be used to locate the chosen position of the body on the base. In mounting and utilizing the device of the present invention, it is important that the exterior side walls of the body supporting the spherical section not be in contact with any foreign object. Minimum contact is permissible at the extreme end of the body opposite the spherical section as long as the contact does not produce stresses which adversely affect the flexure of the spherical section.

THE PREFERRED EMBODIMENT

As shown in FIGS. 1, 2 and 3, a rigid casing of a material such as aluminum is desirable to support and assist in mounting the device including the hollow mount 2 and simulator 3. Casing 1 has a generally cylindrical side wall 4 with an inwardly extending flange 5 at one end thereof. Mount 2 has a base 7 which may have end 9 secured to casing 1 by a pressure sensitive adhesive or other suitable means. Extending from base 7 is a wall 11 having a generally cylindrical shape and an exterior surface 10 tapering inwardly toward the distal end thereof. Seat 8 which is formed by the intersection of tapering surface 10 and base 7 is provided to locate body 12 of the simulator 3. Body 12 is a generally cylindrical member having a cross-section complementary to that of the tapering exterior surface with end 13 and responder 14 at the distal end thereof. The thickness of responder 14 is chosen to flex when subjected to a specific pressure or range of pressures. In one embodiment of the present invention the thickness of responder 14 is selected to provide an area of applanation when subjected to a fluid pulse of a specific pressure against the spherical section of outer surface 15. Prior to positioning end 13 of the simulator against seat 8, the maximum diameter of tapering surface 10 is slightly greater than the internal diameter of body 12 to provide an area 16 of contact therebetween when inserted into body 12.

FIG. 6 illustrates one embodiment of the present invention wherein a pressure guage or similar type pressure sensitive device is connected to casing 1 which has a base 18 providing communication between the interior of the device and the guage. Applanation of the responder 14 occurs when a fluid stream of specific pressure is directed against the face 15 of the spherical section or dome. The force vectors of such a fluid stream may be divided into those parallel to longitudinal axis x—x and those normal to said longitudinal axis. The composition and thickness of body 12 is preferably chosen to provide a substantially rigid response to force vectors P parallel to the longitudinal axis x—x while permitting a flexible response to force vectors N normal to the longitudinal axis x—x. Those skilled in the art are able to determine the proper thickness of responder 14 when applanation of an area 19 is desired in response to a specific pressure of the fluid stream.

FIG. 7 illustrates a holder 20 of the type illustrated in FIG. 5 mounted on an air puff tonometer 21 in a position which would normally be occupied by a patient to be tested. Holder 20 may have any convenient form for mounting on apparatus to be tested and as shown in FIG. 5 a pair of thumb screws 22 are located at the ends of a generally cylindrical solid member 23 having a pair of transverse slots 24 therein for mounting the holder to support bars 25 of tonometer 21. As illustrated in FIG. 5, the holder supports three devices according to the present invention. Each device has the thickness of responder 14 chosen to provide an area 19 of applanation in response to an air puff from the tonometer 21 at a specific pressure. For example, 26 may produce applanation at 15mm Hg with 27 and 28 responding similarly to 25 and 40mm Hg respectively.

An especially preferred embodiment of the device according to FIG. 1 for simulating a chosen interocular pressure when used as shown in FIG. 7 may be constructed with an aluminum casing 1 having an internal diameter of 0.630 in. and an internal flange 5 diameter of ½ in. A base 7 is constructed of silicone rubber such as RTV 616 manufactured by General Electric Company and has an outside diameter of 0.600 in. Wall 11 is preferably cast in one piece of the same silicone rubber and has an internal diameter of about 7/16 in. Tapering surface 10 has a diameter of 0.490 in. at its juncture with seat 8 and a diameter of 0.460 in. at the distal end thereof. The distance from the seat to the distal end of the tapering surface is about ¼ in. and the base has a longitudinal length of about ⅛ in. Simulator 3 has a cylindrical body OD of approximately 0.620 in. and an ID of 0.480 in. with end 13 having an inward taper of about 8°. The body has a longitudinal length of about ½ in. and responder 14 has an outside radius of about 7.8mm. Simulator 3 is preferably cast as a single piece of the same material used to construct mount 2. For use in conjunction with a tonometer, responder 14 has a thickness in the order of 0.011 in. to 0.014 in. to provide the desired area of applanation with RTV 616 in the range of 15 - 40mm Hg.

The particular materials and construction described immediately above have been found to provide a consistent response of applanation at 15mm Hg when the responder thickness is 0.011 in.; 25mm Hg when the responder thickness is 0.013 in. and 40mm Hg when the responder thickness is 0.014 in.

FIG. 8 is a partial view of responder 14 having a condition of applanation area 19 caused by a fluid stream. One advantage of the present invention resides in the ability of responder 14 to reflect radial energy such as light. Therefore, a monitoring system may be positioned to determine the condition of applanation. One type of optical monitoring system is shown in U.S. Pat. No. 3,756,073 issued Sept. 4, 1973.

What is claimed is:

1. A device which is consistently responsive to a fluid pulse comprising:

a mounting means including a resilient base having a generally ring-shaped cross-section and an external surface tapering inwardly toward one end thereof, a resilient simulator adapted to be held by said base, said simulator having a body of a generally ring-shaped cross-section and a responder closing one end of said body, said responder having a chosen thickness and a convex substantially spherical exterior surface, said body having an internal diameter less than the maximum diameter of said external surface of the base, said simulator being mounted with the tapering external surface of said base at least partially within the other end of said body, said external tapering surface having a taper chosen to provide sufficient frictional engagement to hold said simulator such that said responder flexes in a consistent manner under the pressure of a fluid pulse applied to the surface thereo. thereof.

2. The device according to claim 1 further including an outwardly extending flange on said base to locate said simulator on the tapering external surface in a chosen position.

3. The device according to claim 1 wherein each of said base and said simulator is molded as a one piece unit.

4. The device according to claim 1 wherein said mounting means further includes a substantially rigid casing and said base is secured thereto.

5. The device according to claim 2 wherein the other end of said simulator has a surface tapering inwardly toward said one end to provide contact between the outer edge of said flange and the other end of said simulator.

6. The device according to claim 1 wherein the body has a continuous side wall, said side wall having a thickness chosen to provide substantially rigid response to force components parallel to the axis of said ring-shaped cross-section and resilient response to force components normal to the axis of said ring-shaped cross-section.

7. The device according to claim 2 wherein said mounting means further includes a substantially rigid hollow casing, said casing having a continuous internal sidewall complementary to the shape of said body, said side wall having an internal diameter substantially equal to the maximum diameter of said simulator, an inwardly extending flange at one end of said continuous side wall of said casing and said base being inserted in said casing and secured to said casing flange.

8. The device according to claim 1 wherein said responder has a thickness chosen to provide applanation in response to a specific force component normal thereto.

9. A device which is consistently responsive to a fluid pulse comprising:

a mounting means including a hollow, substantially cylindrical rigid casing having an inwardly extending flange on one end thereof, a resilient base secured to said flange in said casing, said base having an exterior surface of revolution extending along an axis substantially coincident with the axis of said casing and said exterior surface tapering inwardly away from said flange, a resilient one piece simulator adapted to be held by said base, said simulator having a hollow body with a continuous side wall of a chosen thickness with an internal diameter less than the maximum internal diameter of the exterior surface of said base, and a convex substantially spherical responder of chosen thickness closing one end of said body, the other end of said body being inserted into said casing and surrounding at least a portion of said exterior surface, said exterior surface having a taper and maximum diameter chosen to provide sufficient frictional engagement to hold said simulator such that said responder flexes in a consistent manner under the pressure of a fluid pulse normal to the surface of said responder, the thickness of said responder being chosen to provide applanation at a specific pressure of said fluid pulse and the side wall thickness of said body being chosen to respond in a substantially rigid manner to force components parallel to the body axis and to yield to force components normal to the body.

10. In combination, at least one device according to claim 9 and a non-contacting tonometer.

11. The combination of claim 10, wherein the thickness of said responder is chosen to provide applanation simulating a specific interocular pressure in response to application of an air pulse from said tonometer.

* * * * *